(12) United States Patent
Sugita et al.

(10) Patent No.: US 10,866,155 B2
(45) Date of Patent: Dec. 15, 2020

(54) METHOD FOR MANUFACTURING PRESSURE-SENSITIVE SENSOR, PRESSURE-SENSITIVE SENSOR MANUFACTURING EQUIPMENT, AND PRESSURE-SENSITIVE SENSOR

(71) Applicant: Hitachi Metals, Ltd., Tokyo (JP)

(72) Inventors: Keisuke Sugita, Tokyo (JP); Masahiro Abe, Tokyo (JP)

(73) Assignee: Hitachi Metals, Ltd., Tokyo (JP)

( * ) Notice: Subject to any disclaimer, the term of this patent is extended or adjusted under 35 U.S.C. 154(b) by 158 days.

(21) Appl. No.: 16/167,820

(22) Filed: Oct. 23, 2018

(65) Prior Publication Data

US 2019/0187015 A1 Jun. 20, 2019

(30) Foreign Application Priority Data

Dec. 18, 2017 (JP) ................. 2017-241622

(51) Int. Cl.
*G01L 9/00* (2006.01)
*B29C 48/30* (2019.01)
(Continued)

(52) U.S. Cl.
CPC .......... *G01L 9/0026* (2013.01); *B29C 48/022* (2019.02); *B29C 48/09* (2019.02);
(Continued)

(58) Field of Classification Search
CPC ..... G01L 19/147; G01L 9/0042; G01L 19/04; G01L 9/0054; G01L 9/0072; G01L 13/025; G01L 19/14; G01L 19/0038; G01L 19/0084; G01L 9/0055; G01L 9/0075; G01L 19/0069; G01L 9/0052; G01L 9/0073; G01L 19/0092; G01L 19/0618;
(Continued)

(56) References Cited

U.S. PATENT DOCUMENTS

| 2009/0085444 A1* | 4/2009 | Alvarez Icaza Rivera ................. H01L 41/1132 310/365 |
| 2011/0179889 A1* | 7/2011 | De Volder .............. G01P 1/026 73/866.5 |
| 2019/0178729 A1* | 6/2019 | Sugita ....................... G01L 1/20 |

FOREIGN PATENT DOCUMENTS

JP    H10-281906 A    10/1998

* cited by examiner

*Primary Examiner* — Andre J Allen
(74) *Attorney, Agent, or Firm* — Scully, Scott, Murphy & Presser, PC

(57) ABSTRACT

A method for manufacturing a pressure-sensitive sensor includes providing an extruder that includes a cylindrical die, a mandrel arranged inside the die and having plural helical grooves on an outer circumferential surface, and an annular outlet sandwiched between the die and the mandrel, and by using the extruder, performing simultaneous extrusion-molding of an elastic insulating material and an elastic conductive material by supplying the elastic conductive material into not less than two of the grooves from the inside of the mandrel while extruding the elastic insulating material, so as to form a pressure-sensitive sensor. The sensor includes a tubular body including an elastic insulation and having a hollow portion along a longitudinal direction, and not less than two conductive ribs including an elastic conductor and helically provided along an inner circumferential surface of the hollow portion of the tubular body so as to protrude inward from the inner circumferential surface.

4 Claims, 7 Drawing Sheets

(51) Int. Cl.
  *B29C 48/32* (2019.01)
  *B29C 48/685* (2019.01)
  *B29C 48/34* (2019.01)
  *B29C 48/156* (2019.01)
  *B29C 48/09* (2019.01)
  *B29C 48/12* (2019.01)
  *B29C 48/00* (2019.01)
  *G01L 19/14* (2006.01)

(52) U.S. Cl.
  CPC ............ *B29C 48/12* (2019.02); *B29C 48/156* (2019.02); *B29C 48/30* (2019.02); *B29C 48/32* (2019.02); *B29C 48/34* (2019.02); *B29C 48/686* (2019.02); *G01L 19/141* (2013.01)

(58) Field of Classification Search
  CPC . G01L 19/0645; G01L 19/143; G01L 9/0051; G01L 19/0007; G01L 19/0046; G01L 19/06; G01L 19/0627; G01L 19/0681; G01L 27/002; G01L 9/00; G01L 9/0041; G01L 9/0044; G01L 11/025; G01L 11/04; G01L 19/0023; G01L 19/0672; G01L 19/069; G01L 19/142; G01L 19/145; G01L 19/16; G01L 7/00; G01L 9/0047; G01L 9/06; G01L 9/065; G01L 9/12; G01L 11/02; G01L 13/00; G01L 15/00; G01L 19/0015; G01L 19/003; G01L 19/02; G01L 19/0609; G01L 19/083; G01L 19/10; G01L 19/148; G01L 27/005; G01L 7/08; G01L 7/082; G01L 7/163; G01L 7/166; G01L 9/0045; G01L 9/0048; G01L 9/006; G01L 9/007; G01L 9/0076; G01L 9/04; G01L 9/045; G01L 9/125; G01L 11/00; G01L 17/00; G01L 19/00; G01L 19/0076; G01L 19/08; G01L 19/141; G01L 19/146; G01L 1/142; G01L 1/2262; G01L 1/246; G01L 21/12; G01L 23/16; G01L 27/007; G01L 7/04; G01L 7/063; G01L 7/084; G01L 7/086; G01L 7/16; G01L 9/0002; G01L 9/0007; G01L 9/0016; G01L 9/0019; G01L 9/0022; G01L 9/0027; G01L 9/0033; G01L 9/0039; G01L 9/005; G01L 9/0058; G01L 9/0077; G01L 9/0079; G01L 9/008; G01L 9/0092; G01L 9/0095; G01L 9/025; G01L 9/08; G01L 9/085; G01L 9/105; G01L 9/14; G01L 9/16; H01L 2224/48091; H01L 2924/00014; H01L 2224/48137; H01L 2224/48145; H01L 2224/73265; H01L 2924/00012; H01L 2224/04105; H01L 2224/24137; H01L 2224/49175; H01L 24/19; H01L 2924/1461; H01L 2924/1815; H01L 2924/18162; H01L 29/84; H01L 41/047; H01L 41/0475; H01L 41/1132
  USPC ..................................................... 73/700–756
  See application file for complete search history.

METHOD FOR MANUFACTURING PRESSURE-SENSITIVE SENSOR, PRESSURE-SENSITIVE SENSOR MANUFACTURING EQUIPMENT, AND PRESSURE-SENSITIVE SENSOR

CROSS-REFERENCE TO RELATED APPLICATIONS

The present application is based on Japanese patent application No. 2017-241622 filed on Dec. 18, 2017, the entire contents of which are incorporated herein by reference.

BACKGROUND OF THE INVENTION

1. Field of the Invention

The invention relates to a method for manufacturing a pressure-sensitive sensor, a pressure-sensitive sensor manufacturing equipment, and a pressure-sensitive sensor.

2. Description of the Related Art

Pressure-sensitive sensors which have electrode wires coming into contact with each other when subjected to an external pressure and thereby acting as a switch are used on automobile sliding doors etc. (see e.g., JP H10/281906 A).

Pressure-sensitive sensor is provided with a tubular elastic insulation having a hollow portion and plural electrode wires which are spaced from each other and are helically arranged on the inner circumferential surface of the elastic insulation. By appropriately adjusting a helical pitch of the electrode wires, it is possible to cause the electrode wires to come into contact with each other under a pressing force in any direction, allowing for detection in all directions.

In a method for manufacturing the known pressure-sensitive sensor, a spacer (dummy wire) and plural electrodes are twisted together, and after applying an elastic insulation therearound, the spacer is pulled out.

SUMMARY OF THE INVENTION

The method for manufacturing the known pressure-sensitive sensor requires a step of making the spacer and a step of pulling out the spacer and, therefore, a problem may arise that it takes time for the manufacturing.

It is an object of the invention to provide a method for manufacturing a pressure-sensitive sensor and a pressure-sensitive sensor manufacturing equipment that reduce the number of manufacturing steps of a pressure-sensitive sensor, as well as a pressure-sensitive sensor.

According to an embodiment of the invention, a method for manufacturing a pressure-sensitive sensor comprises:

providing an extruder that comprises a cylindrical die, a mandrel arranged inside the die and having a plurality of helical grooves on an outer circumferential surface, and an annular outlet sandwiched between the die and the mandrel; and by using the extruder, performing simultaneous extrusion-molding of an elastic insulating material and an elastic conductive material by supplying the elastic conductive material into not less than two of the grooves from the inside of the mandrel while extruding the elastic insulating material, so as to form a pressure-sensitive sensor, wherein the pressure-sensitive sensor comprises a tubular body comprising an elastic insulation and having a hollow portion along a longitudinal direction, and not less than two conductive ribs comprising an elastic conductor and helically provided along an inner circumferential surface of the hollow portion of the tubular body so as to protrude inward from the inner circumferential surface.

According to another embodiment of the invention, a pressure-sensitive sensor manufacturing equipment comprises:

a cylindrical die;
a mandrel arranged inside the die; and
an annular outlet sandwiched between the die and the mandrel, wherein the outlet is configured such that a tubular body comprising an elastic insulation and a hollow portion along a longitudinal direction thereof can be extrusion-molded by discharging an elastic insulating material through the outlet, and wherein the mandrel comprises a plurality of helical grooves formed on an outer circumferential surface thereof and an elastic conductive material flow path for supplying an elastic conductive material into not less than two of the grooves from the inside of the mandrel.

According to another embodiment of the invention, a pressure-sensitive sensor comprises:

a tubular body comprising an elastic insulation and having a hollow portion along a longitudinal direction; and
a plurality of helical ribs that are helically provided along an inner circumferential surface of the hollow portion of the tubular body and protrude inward from the inner circumferential surface, wherein the helical ribs comprise not less than two conductive ribs comprising an elastic conductor and one or more insulating ribs comprising an elastic insulation.

Effects of the Invention

According to an embodiment of the invention, a method for manufacturing a pressure-sensitive sensor and a pressure-sensitive sensor manufacturing equipment can be provided that reduce the number of manufacturing steps of a pressure-sensitive sensor, as well as a pressure-sensitive sensor.

BRIEF DESCRIPTION OF THE DRAWINGS

Next, the present invention will be explained in more detail in conjunction with appended drawings, wherein:

FIGS. 1A and 1B are diagrams illustrating a pressure-sensitive sensor manufactured by a method for manufacturing a pressure-sensitive sensor in an embodiment of the present invention, wherein FIG. 1A is a cross sectional view perpendicular to a longitudinal direction and FIG. 1B is a perspective view;

FIGS. 3A and 3B are diagrams illustrating a pressure-sensitive sensor manufacturing equipment, wherein FIG. 3A is a cross sectional view and FIG. 3B is a further cross-sectional view taken on line A-A of FIG. 3A;

DETAILED DESCRIPTION OF THE PREFERRED EMBODIMENTS

Embodiment

An embodiment of the invention will be described below in conjunction with the appended drawings.

Pressure-Sensitive Sensor 1

Figure 1A:
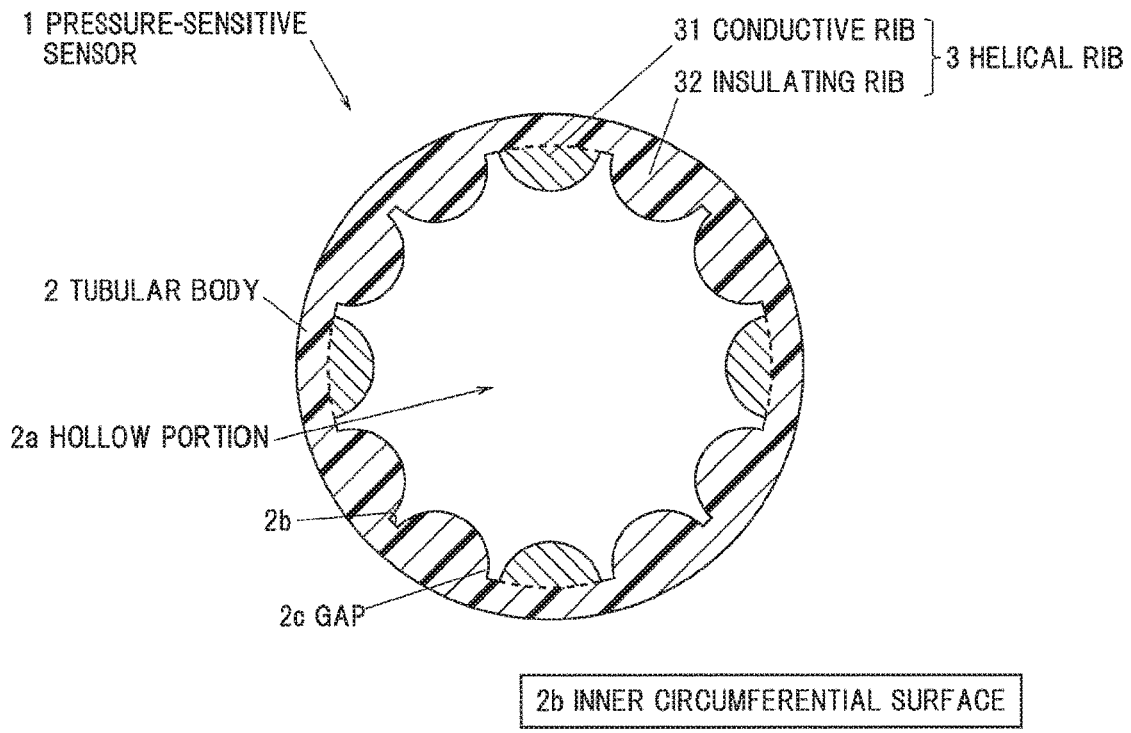
Figure 1B:
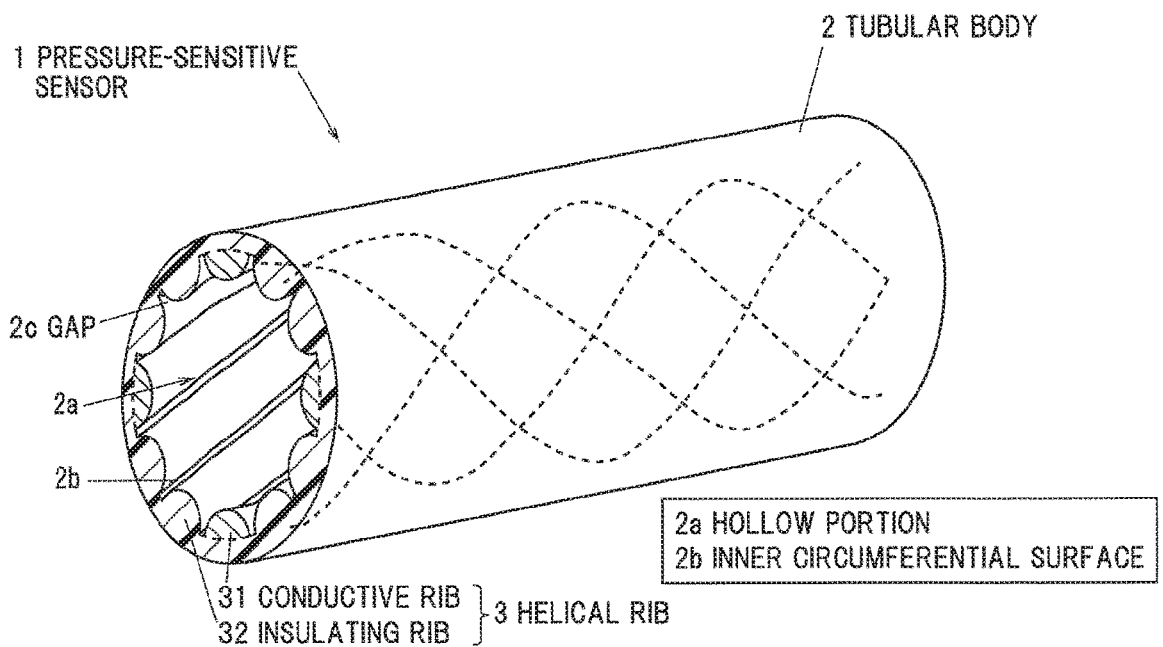

FIGS. 1A and 1B are diagrams illustrating a pressure-sensitive sensor manufactured by a method for manufacturing a pressure-sensitive sensor in the present embodiment, wherein FIG. 1A is a cross sectional view perpendicular to a longitudinal direction and FIG. 1B is a perspective view.

As shown in FIGS. 1A and 1B, a pressure-sensitive sensor 1 is provided with a tubular body 2 which is formed in a cylindrical shape (has a cylindrical shape in a state that a pressing force is not applied externally) and has a hollow portion 2a along a longitudinal direction, and plural helical ribs 3 which are helically provided along an inner circumferential surface 2b of the hollow portion 2a of the tubular body 2 and protrude inward (radially inward of the tubular body 2) from the inner circumferential surface 2b.

The tubular body 2 is formed of an elastic insulation. The elastic insulation used to form the tubular body 2 desirably has a small compression set and is excellent in flexibility, cold resistance, water resistance, chemical resistance and weather resistance, etc. In detail, as the elastic insulation, it is possible to suitably use, e.g., a rubber-based composition obtained by cross-linking an ethylene-propylene-diene copolymer, or an olefin-based or styrene-based thermoplastic elastomer composition not requiring a cross-linking process. The outer diameter of the tubular body 2 is, e.g., 4 mm.

In the present embodiment, the helical ribs 3 include not less than two conductive ribs 31 formed of an elastic conductor and one or more insulating ribs 32 formed of an elastic insulation. Although four conductive ribs 31 and eight insulating ribs 32 are provided in this example, the numbers of the conductive ribs 31 and the insulating ribs 32 are not limited thereto.

In the present embodiment, the helical rib 3 is formed to have a substantially semi-circular cross-sectional shape. Although the details will be described later, the insulating ribs 32 having a substantially semi-circular shape can guide the conductive ribs 31 more easily when a pressing force is applied externally, and the conductive ribs 31 are thus more likely to come into contact with each other. However, the cross-sectional shape of the helical rib 3 is not limited to a substantially semi-circular shape and can be appropriately changed. The number and shape of the helical ribs 3 are changeable by changing the number and shape of grooves 121 (see FIGS. 3 and 4) of a mandrel 12 (described later).

The conductive ribs 31 are positioned to face each other in a direction perpendicular to a longitudinal direction of the tubular body since the conductive ribs 31 easily come into contact with each other when a pressing force is applied externally. In this example, among twelve helical ribs 3 provided at equal intervals in a circumferential direction, four helical ribs 3 arranged at equal intervals in the circumferential direction are the conductive ribs 31 and the other helical ribs 3 are the insulating ribs 32. In this example, two insulating ribs 32 are arranged in each space between circumferentially-adjacent conductive ribs 31. In addition, the conductive ribs 31 are arranged to be 90 degrees rotationally symmetric in the circumferential direction of the tubular body 2.

In addition, in the pressure-sensitive sensor 1, gaps 2c are formed between adjacent helical ribs 3 (between the conductive rib 31 and the insulating rib 32 adjacent to each other and between the insulating ribs 32 adjacent to each other). This allows the pressure-sensitive sensor 1 to deform easily even when the externally applied pressing force is small, thereby contributing to improvement in sensitivity.

The elastic insulation used to form the insulating rib 32 is the same as that used to form the tubular body 2. In other words, the insulating rib 32 is a portion of the elastic insulation constituting the tubular body 2 which protrudes radially inward from the inner circumferential surface 2b of the tubular body 2.

The elastic conductor used to form the conductive rib 31 has a small compression set, is excellent in flexibility, cold resistance, water resistance, chemical resistance and weather resistance, etc., in the same manner as the elastic insulation, and has high electrical conductivity and high adhesion to the elastic insulation. It is more preferable to use an elastic conductor obtained by adding a conductive filler such as carbon black to the elastic insulation used for the tubular body 2. That is, the elastic conductor used for the conductive rib 31 and the elastic insulation used for the tubular body 2 and the insulating rib 32 desirably have the same principal constituents. In detail, as the elastic conductor, it is possible to suitably use, e.g., a mixture of a conductive filler such as carbon black with a rubber-based composition obtained by cross-linking an ethylene-propylene-diene copolymer or with an olefin-based or styrene-based thermoplastic elastomer composition not requiring a cross-linking process.

Figure 2A:
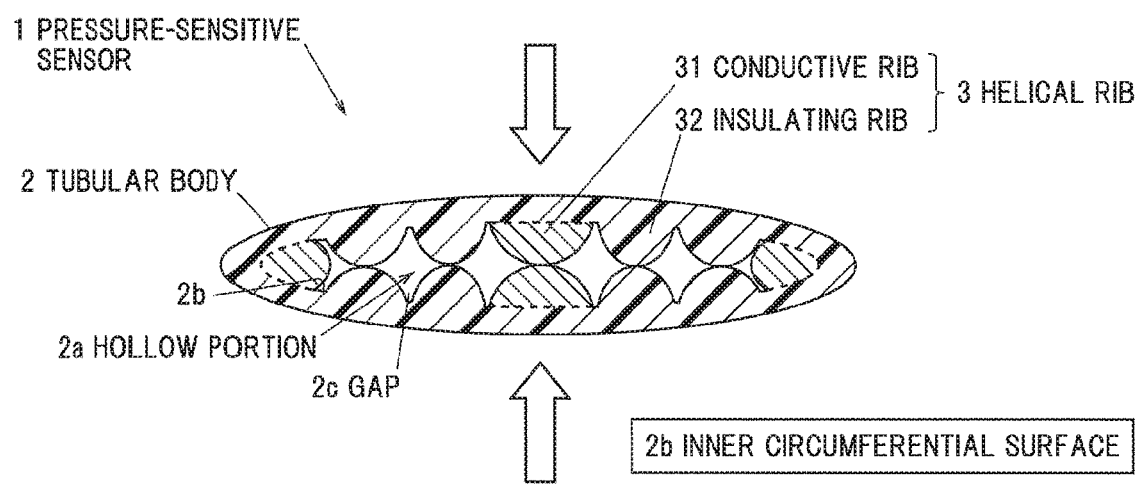
FIGS. 2A and 2B are cross sectional views showing the pressure-sensitive sensor under an externally applied pressing force.

When a pressing force is applied externally, the tubular body 2 elastically deforms and the conductive ribs 31 come into contact with each other as shown in FIG. 2A. The pressure-sensitive sensor 1 is desired to promptly restore to the original shape when the applied pressing force is released. In the present embodiment, the insulating ribs 32 having elasticity also deform (squashed) together when a pressing force is applied externally. Thus, the insulating ribs 32 serve to increase the restoring force and to promptly restore the shape of the pressure-sensitive sensor 1.

Figure 2B:
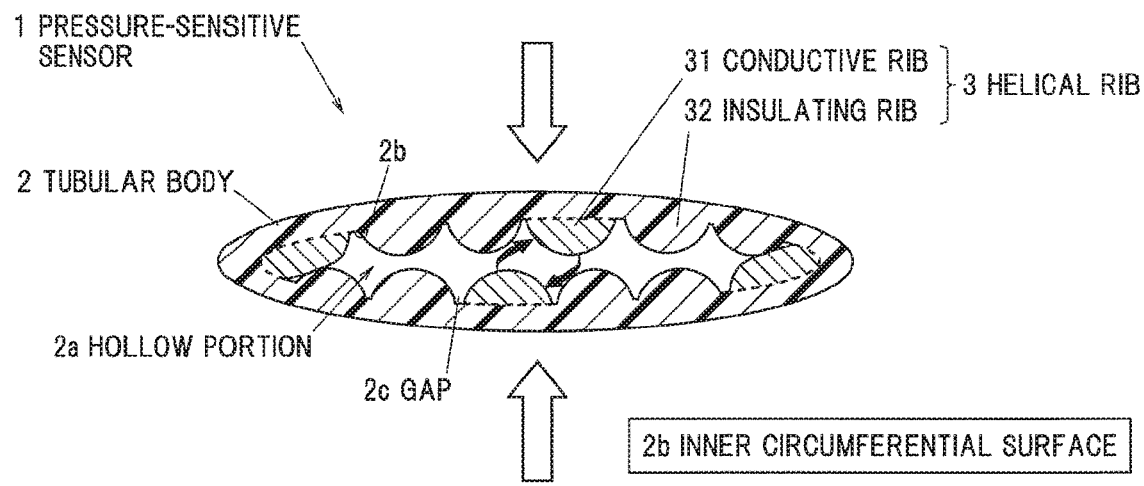

In addition, since the insulating ribs 32 serve to guide the conductive ribs 31, the facing conductive ribs 31 can easily come into contact with each other even when a pressing force is applied in a direction slightly inclined with respect to a direction that the conductive ribs 31 face each other as shown in FIG. 2B. In other words, an empty space in the hollow portion 2a, which prevents the conductive ribs 31 from coming in contact with each other, is filled with the insulating ribs 32 which thereby serve to cause the facing conductive ribs 31 to come into contact with each other when a pressing force is applied externally.

Although the details will be described later, the insulating ribs 32 further serve to adjust a helical pitch of the conductive ribs 31 (the helical ribs 3). The helical pitch of the conductive ribs 31 here means a length along the longitudinal direction of the tubular body 2 between given two circumferential points for one turn of the conductive rib 31 on the inner circumferential surface 2b of the tubular body 2. The details of adjustment of the helical pitch will be described later.

Pressure-Sensitive Sensor Manufacturing Equipment

Figure 3A:
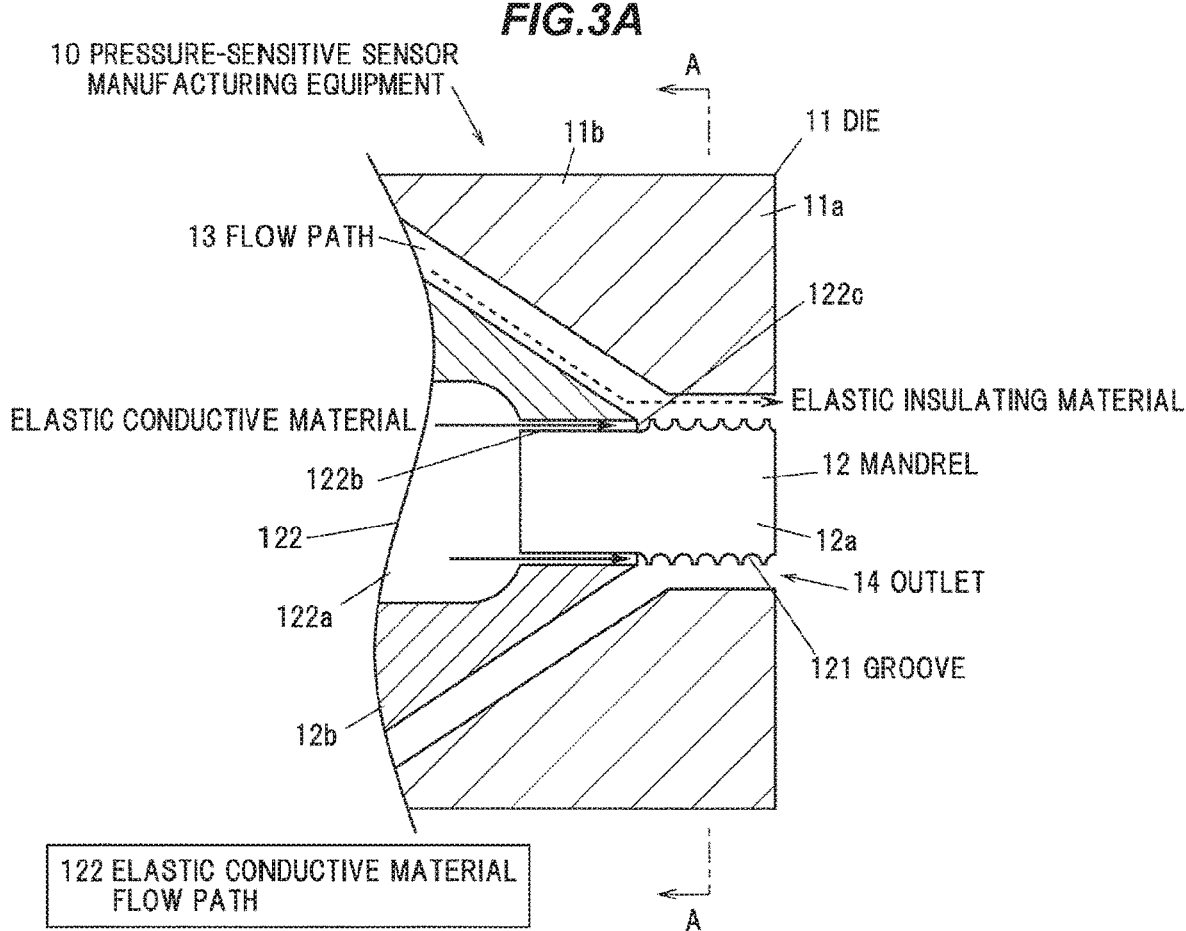
Figure 3B:
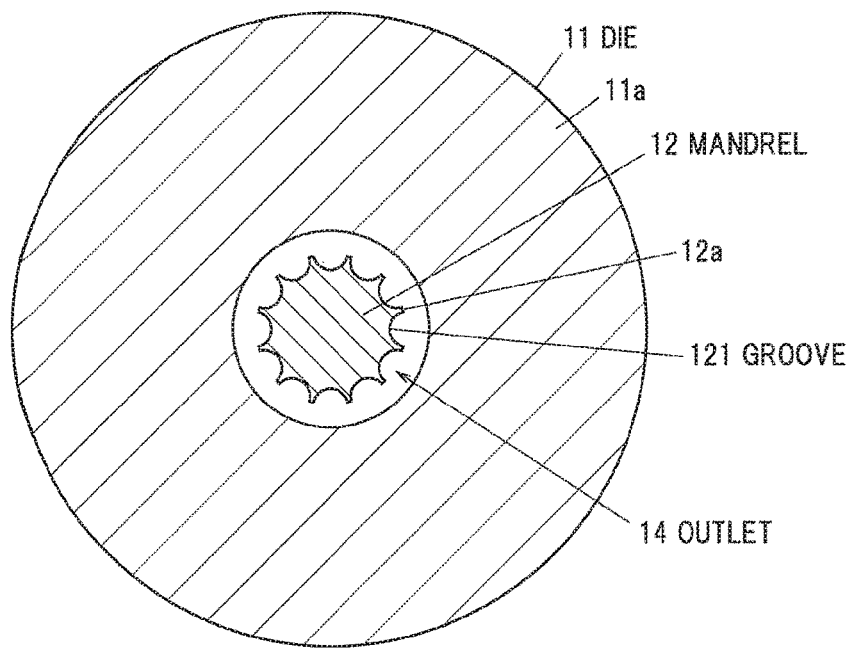
Figure 4:
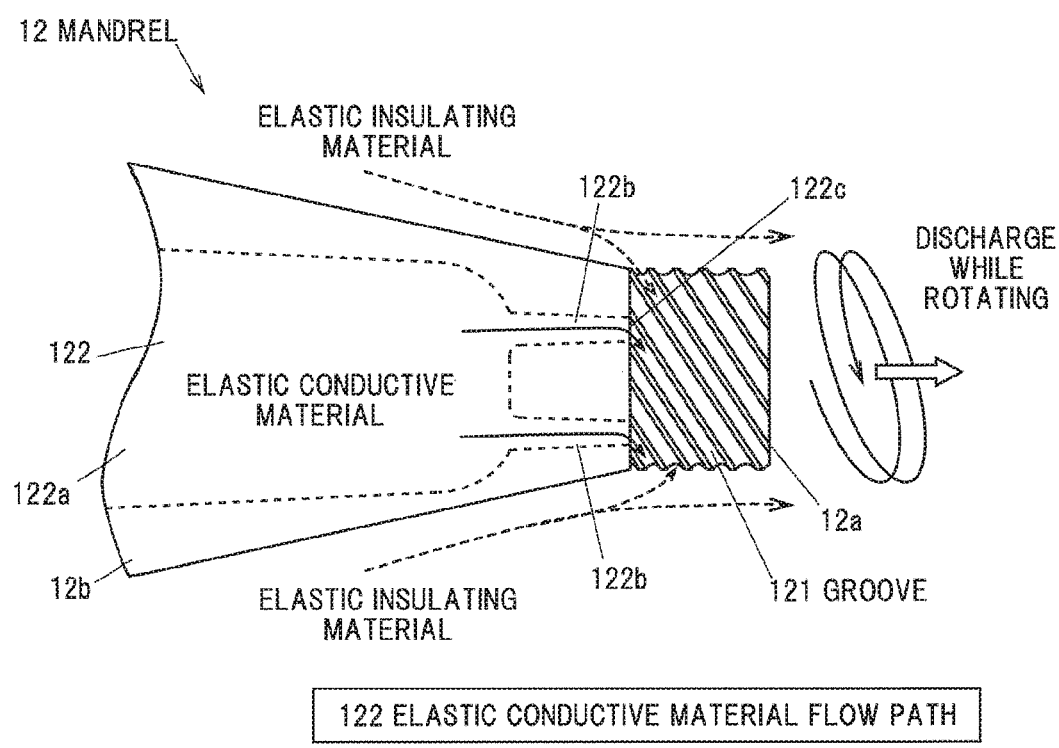
FIG. 4 is an explanatory side view showing a mandrel and also showing flow of the materials.

FIGS. 3A and 3B are diagrams illustrating a pressure-sensitive sensor manufacturing equipment, wherein FIG. 3A is a cross sectional view and FIG. 3B is a further cross-sectional view taken on line A-A of FIG. 3A. FIG. 4 is an explanatory side view showing a mandrel and also showing flow of the materials. A pressure-sensitive sensor manufacturing equipment 10 is an extruder used to manufacture the pressure-sensitive sensor 1 by extrusion molding. The pressure-sensitive sensor manufacturing equipment 10 in the present embodiment is capable of two-layer co-extrusion in which the elastic insulation and the elastic conductor are simultaneously extruded.

As shown in FIGS. 3A, 3B and 4, the pressure-sensitive sensor manufacturing equipment 10 is provided with a cylindrical die 11 and a mandrel 12 arranged inside the die 11. Between the die 11 and the mandrel 12 is a flow path 13 of a molten elastic insulating material. The elastic insulating material is a liquid form of the elastic insulation melted by heat. A supply channel in communication with the flow path 13 is provided on the die 11 to supply the elastic insulating material to the flow path 13, even though it is not shown in the drawings.

The pressure-sensitive sensor manufacturing equipment 10 has an annular outlet 14 which is sandwiched between the die 11 and the mandrel 12. In the pressure-sensitive sensor manufacturing equipment 10, an opening of the die 11 on the discharge side has a circular shape when viewed from the discharge side and an end portion of the mandrel 12 on the discharge side is formed in a substantially columnar shape. In addition, an end face of the die 11 on the discharge side is substantially level with an end face of the mandrel 12 on the discharge side. The pressure-sensitive sensor manufacturing equipment 10 is configured that the tubular body 2 having the hollow portion 2a along the longitudinal direction can be extrusion-molded by discharging the elastic insulating material from the annular outlet 14.

The die 11 has a constant inner diameter from the outlet 14 to a predetermined distance. The portion having a constant inner diameter is referred to as a constant diameter portion 11a. A tapered portion 11b having an inner diameter which increases as distance from the constant diameter portion 11a is provided integrally with the constant diameter portion 11a on the side opposite to the outlet 14.

The mandrel 12 has a circular column-shaped portion 12a housed in the constant diameter portion 11a of the die 11 and having a substantially constant outer diameter, and a tapered portion 12b provided integrally with the column-shaped portion 12a on the side opposite to the outlet 14 and having an outer diameter which increases as distance from the column-shaped portion 12a.

The mandrel 12 also has plural helical grooves 121 formed on an outer circumferential surface of the column-shaped portion 12a, and an elastic conductive material flow path 122 for supplying the elastic conductive material into not less than two grooves 121 from the inside of the mandrel 12. The elastic conductive material is a liquid form of the elastic conductor melted by heat, or is obtained by adding a conductive filler to a liquid form of the elastic insulation melted by heat.

The elastic conductor supplied into the grooves 121 and the elastic insulation supplied from the flow path 13 need to be maintained in a contact state for a certain period of time for sufficient adhesion (fusion) therebetween. Thus, a length of a region with the grooves 121, i.e., a length of the column-shaped portion 12a, is adjusted to a length at which the elastic conductor supplied into the grooves 121 and the elastic insulation supplied from the flow path 13 are sufficiently adhered (fused) by heat during molding.

The bottom surface of the groove 121 is desirably formed in a rounded shape so that the materials flow easily. To further increase flowability of the materials, the cross-sectional shape of the groove 121 is desirably a substantially semi-circular shape or a substantially semi-elliptical shape. Given that the column-shaped portion 12a has a shape of complete circular column, the cross-sectional shape of the groove 121 here is a shape of a missing portion formed by providing the groove 121 and is a cross-sectional shape perpendicular to the longitudinal direction of the groove 121.

In the pressure-sensitive sensor manufacturing equipment 10, the material flowing in the vicinity of the die 11 (the elastic insulating material) tries to flow straight toward the outlet 14. On the other hand, the materials introduced into the grooves 121 (the elastic conductive material and the elastic insulating material) try to flow helically along the grooves 121. As a result, the straight-flowing material is affected by the helically-flowing materials, and the materials are discharged from the outlet 14 while being rotated in a circumferential direction (see FIG. 4). The circumferential direction here is a circumferential direction of the discharged pressure-sensitive sensor 1 (tubular body 2).

That is, by forming the helical grooves 121 on the outer circumferential surface of the tip (the column-shaped portion 12a) of the mandrel 12, the materials are discharged while being rotated. As a result, it is possible to form the helical ribs 3 which are provided helically along the inner circumferential surface 2b of the hollow portion 2a of the tubular body 2. The direction of rotation of the materials when discharged is the same as the helical direction of the helical ribs 3.

Furthermore, by supplying the elastic conductive material into not less than two grooves 121 from the inside of the mandrel 12 via the elastic conductive material flow path 122, the elastic insulating material and the elastic conductive material are simultaneously extrusion-molded and some of the helical ribs 3 are formed as the conductive ribs 31. The elastic conductive material flow path 122 has a hollow portion 122a formed inside the mandrel 12, and plural branch paths 122b which are branched from the hollow portion 122a. An end portion of each branch path 122b on the side opposite to the hollow portion 122a is an exit 122c in communication with a starting end (an end opposite to the outlet 14) of the groove 121.

The elastic insulating material supplied from the flow path 13 enters the grooves 121 to which the elastic conductive material is not supplied, and the insulating ribs 32 are thereby formed. Thus, the elastic conductive material flow path 122 is unconnected to at least one of the plural grooves 121 to form the insulating rib/ribs 32.

The helical pitch of the helical rib 3 (the conductive rib 31) depends on the degree of rotation of the material discharged from the outlet 14. The degree of rotation can be adjusted by changing a ratio (volume ratio) of the helically-flowing material in the grooves 121 to the straight-flowing material not entered in the grooves 121, and an angle of the grooves 121 (the helical pitch of the grooves 121). By, e.g., increasing the cross-sectional area of the grooves 121 to increase the cross-sectional area of the helical ribs 3 or by reducing the width of the outlet 14 (a distance between the die 11 and the mandrel 12) to reduce the thickness of the tubular body 2, the rotational speed of the materials discharged from the outlet 14 can be increased and the helical pitch of the helical ribs 3 (the conductive ribs 31) can be thereby reduced.

That is, in the pressure-sensitive sensor manufacturing equipment 10, it is possible to adjust the helical pitch of the helical ribs 3 by appropriately adjusting the cross-sectional area and angle of the groove 121 and the width of the outlet 14. Thus, the cross-sectional area and angle of the groove 121 and the width of the outlet 14 are appropriately adjusted according to the intended use, etc., so that the helical ribs 3 (the conductive ribs 31) have a desired helical pitch.

Method for Manufacturing the Pressure-Sensitive Sensor

In the method for manufacturing a pressure-sensitive sensor in the present embodiment, the pressure-sensitive sensor manufacturing equipment 10 described in reference to FIGS. 3 and 4 is used, and the elastic insulating material and the elastic conductive material are simultaneously extrusion-molded by supplying the elastic conductive material into not less than two grooves 121 from the inside of the mandrel 12 while extruding the elastic insulating material. In other words, in the method for manufacturing a pressure-sensitive sensor in the present embodiment, the elastic insulation as an outer layer and the elastic conductor as an inner layer are simultaneously extrusion-molded. In addition, the material is extruded from the outlet 14 while being rotated due to the material flowing in the helical grooves 121.

Since the flow path of the elastic conductive material to be an inner layer is limited to the grooves 121 and, moreover, the material is discharged while being rotated, the conductive ribs 31 are helically formed along the inner circumferential surface 2*b* of the tubular body 2. As a result, the pressure-sensitive sensor 1 shown in FIG. 1 is manufactured, which has the tubular body 2 formed of an elastic insulation and having the hollow portion 2*a* along the longitudinal direction, and not less than two conductive ribs 31 formed of an elastic conductor and helically provided along the inner circumferential surface 2*b* of the hollow portion 2*a* of the tubular body 2 so as to protrude inward from the inner circumferential surface 2*b*.

Modification

Figure 5A:
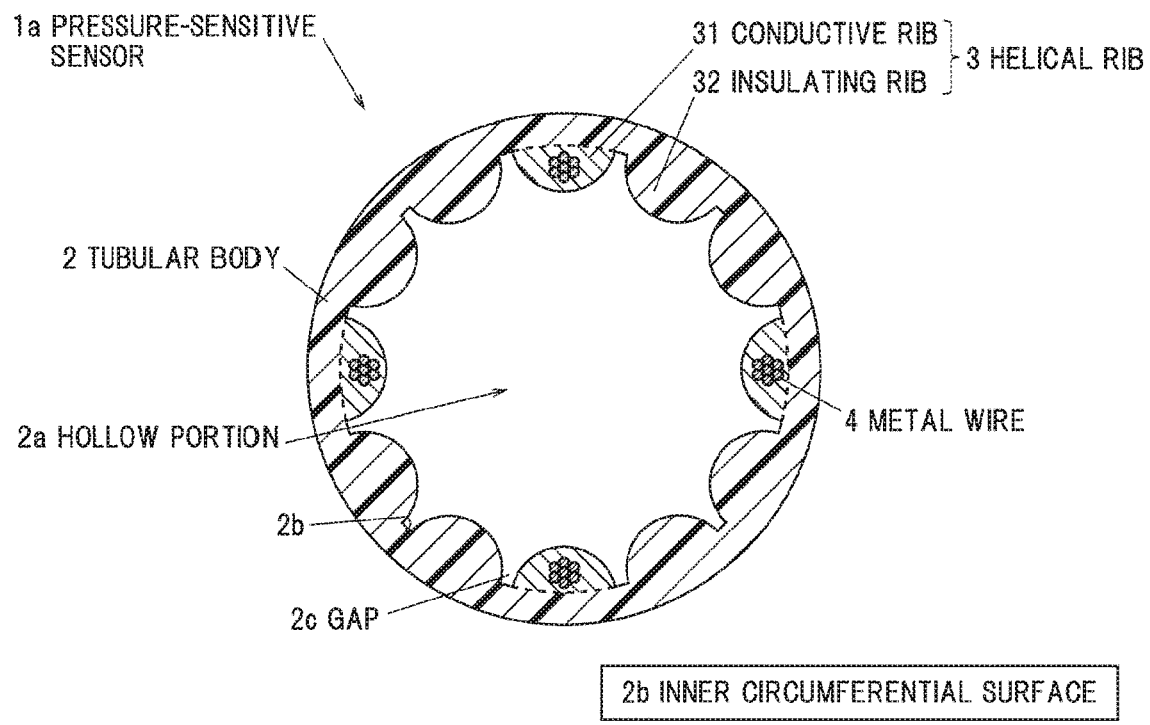
FIGS. 5A and 5B are cross sectional views showing pressure-sensitive sensors in modifications of the invention.

Metal wires 4 may be provided to run inside the conductive ribs 31 as is a pressure-sensitive sensor 1*a* shown in FIG. 5A. The metal wire 4 can be, e.g., a solid wire formed of a highly conductive metal such as copper or a twisted wire formed by twisting plural strands. In FIG. 5, the metal wire 4 which is a twisted wire formed by twisting seven strands is shown as an example. Alternatively, a tinsel copper wire formed by wrapping copper foil around a string formed of polyester, etc., can be used as the metal wire 4. Furthermore, a surface of the metal wire 4 may be plated with tin, nickel, silver or zinc, etc., to have higher heat resistance. A method of passing the metal wires 4 is not specifically limited. For example, the metal wires 4, together with the elastic conductive material, are fed from the elastic conductive material flow path 122 and are guided to the outlet 14 along the grooves 121.

Figure 5B:
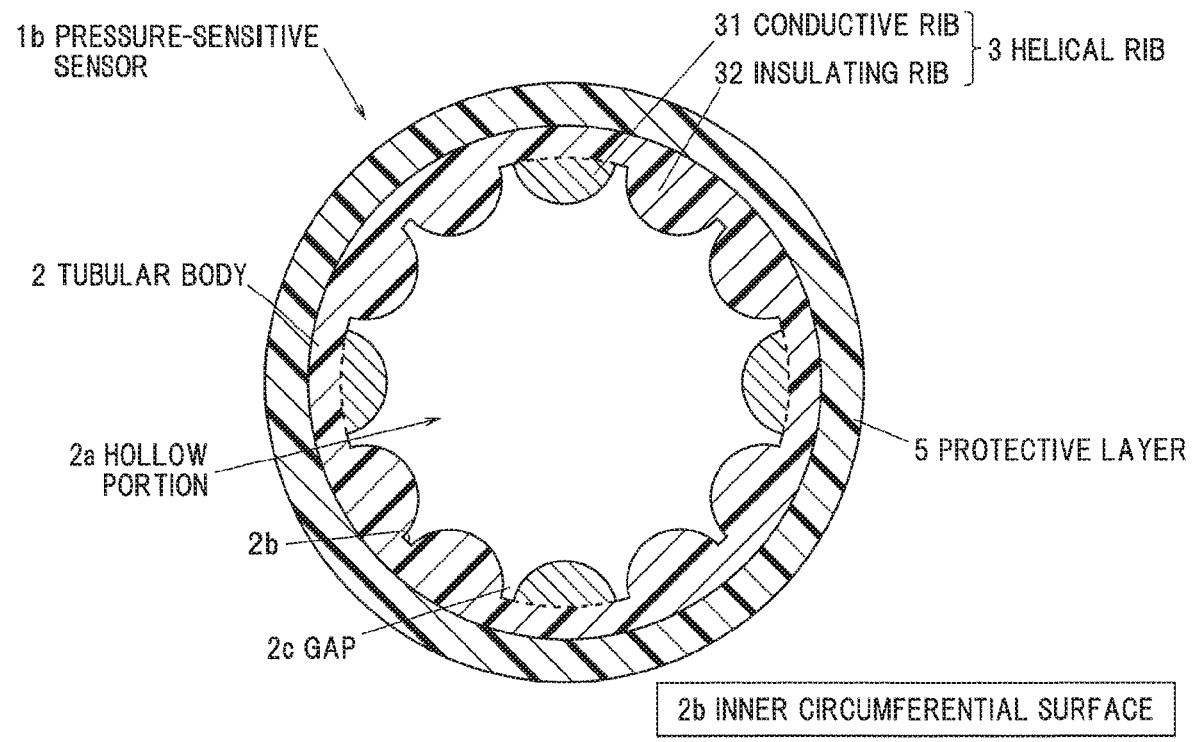

As an alternative, a protective layer (outer layer) 5 for protecting the tubular body 2 may be formed around the tubular body 2 as is a pressure-sensitive sensor 1*b* shown in FIG. 5B. The protective layer 5 serves to increase strength of the pressure-sensitive sensor 1*b* by protecting the tubular body 2 and also serves to improve adhesion to other members. An end of the pressure-sensitive sensor 1*b* is generally sealed with a resin such as polyamide or polyurethane to prevent ingress of water into the hollow portion 2*a*. When adhesion between such sealing resin and the tubular body 2 is not sufficient, water-tightness may not be able to be ensured when directly sealing the tubular body 2. By covering the tubular body 2 with the protective layer 5 having high adhesion to a resin of the tubular body 2 and to the sealing resin, it is possible to prevent the sealing resin from coming off and thereby possible to ensure water-tightness.

The protective layer 5 desirably has elasticity and is excellent in strength and abrasion resistance, and can be formed of, e.g., thermoplastic polyurethane. After forming the tubular body 2 and the helical ribs 3 (the conductive ribs 31 and the insulating ribs 32) by using the pressure-sensitive sensor manufacturing equipment 10 shown in FIG. 3, the protective layer 5 is formed around the tubular body 2 by extrusion molding, thereby obtaining the pressure-sensitive sensor 1*b*.

Figure 6A:
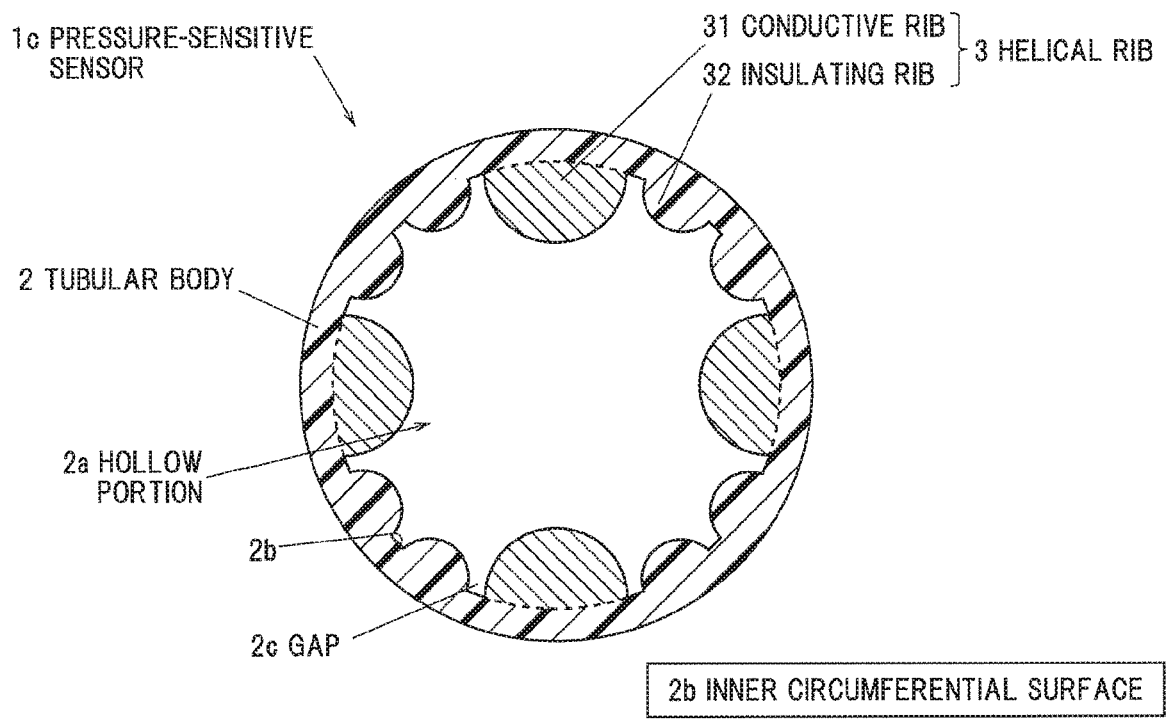
FIGS. 6A and 6B are cross sectional views showing pressure-sensitive sensors in other modifications of the invention.

Meanwhile, although the example in which the size (cross-sectional area) of the conductive rib 31 is the same as the size (cross-sectional area) of the insulating rib 32 has been described in the present embodiment, the size (cross-sectional area) of each conductive rib 31 may be larger than the size of each insulating rib 32 as is a pressure-sensitive sensor 1*c* shown in FIG. 6A. With this configuration, the conductive ribs 31 come into contact with each other more easily when a pressing force is applied externally.

Although FIG. 6A shows an example in which the conductive rib 31 is configured that both a protruding length from the inner circumferential surface 2*b* of the tubular body 2 and a width in a circumferential direction are larger than those of the insulating rib 32, the conductive rib 31 may be larger in either the protruding length or the width than the insulating rib 32. The sizes of the conductive rib 31 and the insulating rib 32 can be appropriately adjusted by changing the shape (width and depth) of the grooves 121.

Figure 6B:
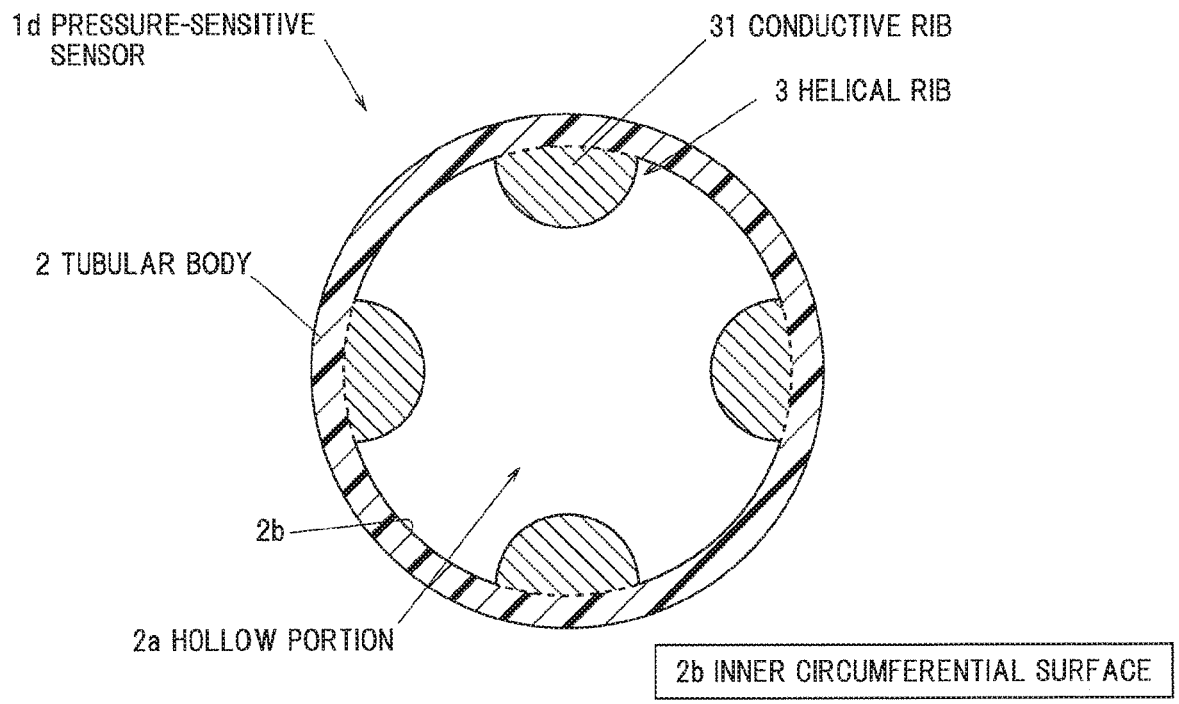

Furthermore, the insulating ribs 32 may be omitted, as is a pressure-sensitive sensor 1*d* shown in FIG. 6B. In this case, however, a turning force at the time of discharge may not be sufficient due to absence of the insulating ribs 32, causing an increase in the helical pitch of the conductive ribs 31. For this reason, the cross-sectional area of each conductive rib 31 in this case is desired to be increased as much as possible to ensure a sufficient turning force at the time of discharge and to reduce the helical pitch of the conductive ribs 31.

Figure 7A:
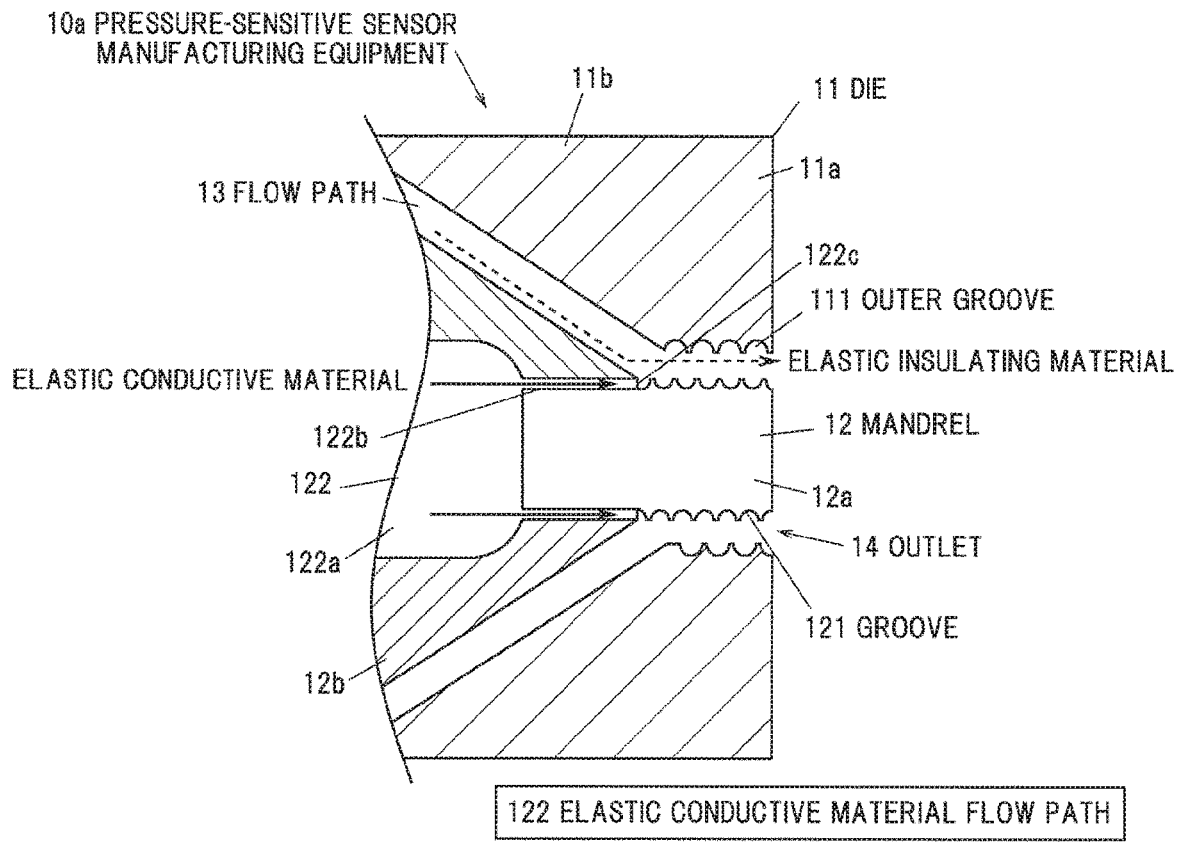
FIG. 7A is a cross sectional view showing a pressure-sensitive sensor manufacturing equipment in a modification of the invention.

In case that further reduction of the helical pitch of the conductive ribs 31 is required, helical outer grooves 111 may be formed on an inner circumferential surface of the constant diameter portion 11*a* of the die 11 as is a pressure-sensitive sensor manufacturing equipment 10*a* shown in FIG. 7A to increase the turning force at the time of discharge. The helical direction of the outer grooves 111 (a direction in which the outer grooves 111 rotate toward the discharge side when viewed from the discharge side) is the same as the helical direction of the grooves 121 of the mandrel 12.

Figure 7B:
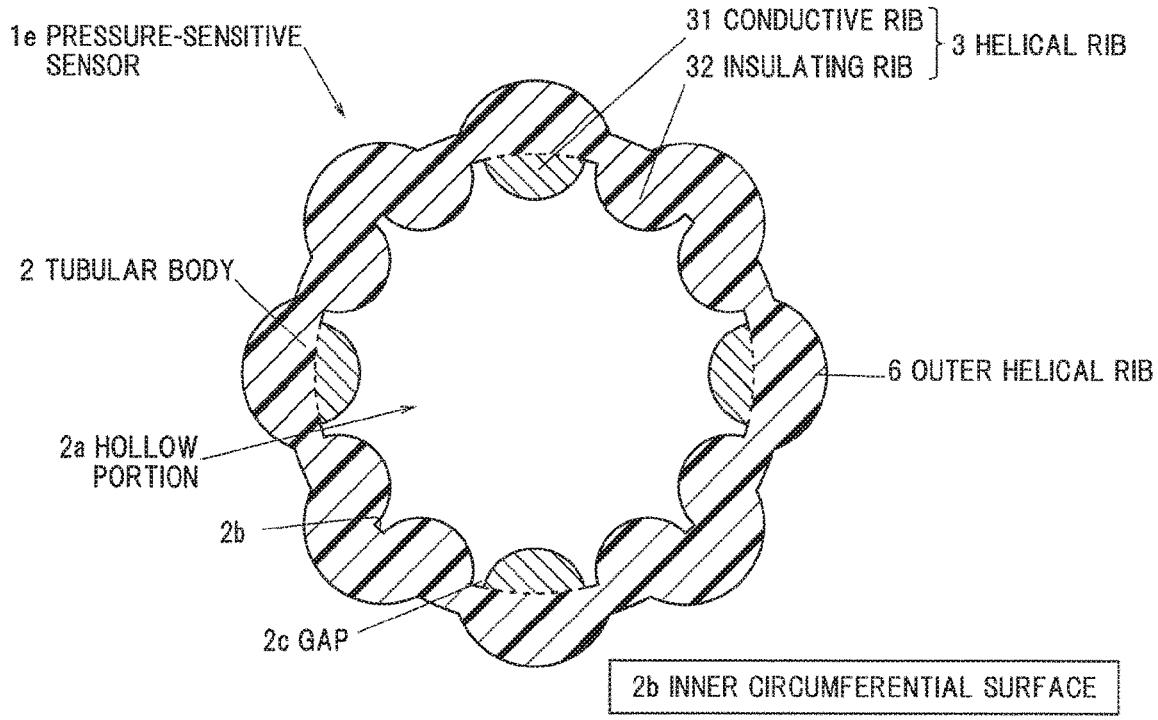
FIG. 7B is a cross sectional view showing a pressure-sensitive sensor in a modification of the invention manufactured by the pressure-sensitive sensor manufacturing equipment shown in FIG. 7A.

FIG. 7B is a cross sectional view showing a pressure-sensitive sensor 1*e* manufactured by the pressure-sensitive sensor manufacturing equipment 10*a*. The pressure-sensitive sensor 1*e* has plural outer helical ribs 6 which are helically provided along an outer circumferential surface of the tubular body 2 and protrude radially outward from the outer circumferential surface. The helical direction of the outer helical ribs 6 (a direction in which the outer helical ribs 6 rotate toward a given end portion when viewed from the given end portion) is the same as the helical direction of the helical ribs 3. The pressure-sensitive sensor 1*e* when inserted into, e.g., a cover formed of a rubber material, etc., has a small contact area with the cover due to having the outer helical ribs 6 and it is thus easy to insert the pressure-sensitive sensor 1e into the cover. In addition, in case that the protective layer 5 (see FIG. 5B) is provided around the tubular body 2, the protective layer 5 enters between the outer helical ribs 6, and adhesion of the tubular body 2 to the protective layer 5 is improved by an anchor effect.

Functions and Effects of the Embodiment

As described above, in the method for manufacturing a pressure-sensitive sensor in the present embodiment, by using the pressure-sensitive sensor manufacturing equipment 10 as an extruder which has the cylindrical die 11, the mandrel 12 arranged inside the die 11 and having plural helical grooves 121 on the outer circumferential surface, and the annular outlet 14 sandwiched between the die 11 and the mandrel 12, the elastic insulating material and the elastic conductive material are simultaneously extrusion-molded by supplying the elastic conductive material into not less than two of the grooves 121 from the inside of the mandrel 12 while extruding the elastic insulating material.

Thus, it is possible to discharge the materials while rotating and thereby possible to form the pressure-sensitive sensor 1 which has the tubular body 2 formed of an elastic insulation and having the hollow portion 2a along the longitudinal direction, and not less than two conductive ribs 31 formed of an elastic conductor and helically provided along the inner circumferential surface 2b of the hollow portion 2a of the tubular body 2 so as to protrude inward from the inner circumferential surface 2b.

In the conventional method using a spacer (dummy wire), a step of making the spacer and a step of pulling out the spacer after extrusion molding are required and it takes time for manufacturing. In addition, in the conventional method, it is necessary to pull out the spacer after cutting into short lengths to prevent the spacer from being broken or the electrode wires from being damaged when pulling out the spacer, and it is thus difficult to manufacture a long pressure-sensitive sensor. Furthermore, it is necessary to use an expensive, highly slidable fluorine-based resin to form a spacer so that the spacer can be easily pulled out, but since the spacer is cut into short lengths, it is not possible to reuse the spacer and this causes an increase in the cost.

According to the present embodiment, since it is possible to manufacture the pressure-sensitive sensor 1 without using the spacer, it is easy to manufacture the pressure-sensitive sensor 1 and it is possible to significantly reduce the manufacturing cost. In addition, since the spacer is not used in the invention, the length is not limited and it is possible to manufacture a long pressure-sensitive sensor 1 of, e.g., several tens meters in length.

The pressure-sensitive sensor 1 of the invention can be widely used on sliding door, back door and power window of automobile, elevator door, shutter, automatic door, vehicle door and home door, etc., for anti-pinch application.

SUMMARY OF THE EMBODIMENTS

Technical ideas understood from the embodiment will be described below citing the reference numerals, etc., used for the embodiment. However, each reference numeral described below is not intended to limit the constituent elements in the claims to the members, etc., specifically described in the embodiment.

[1] A method for manufacturing a pressure-sensitive sensor, comprising: using an extruder that comprises a cylindrical die (11), a mandrel (12) arranged inside the die (11) and having a plurality of helical grooves (121) on an outer circumferential surface, and an annular outlet (14) sandwiched between the die (11) and the mandrel (12); and performing simultaneous extrusion-molding of an elastic insulating material and an elastic conductive material by supplying the elastic conductive material into not less than two of the grooves (121) from the inside of the mandrel (12) while extruding the elastic insulating material, thereby forming a pressure-sensitive sensor (1) that comprises a tubular body (2) comprising an elastic insulation and having a hollow portion (2a) along a longitudinal direction, and not less than two conductive ribs (31) comprising an elastic conductor and helically provided along an inner circumferential surface (2b) of the hollow portion (2a) of the tubular body (2) so as to protrude inward from the inner circumferential surface (2b).

[2] A pressure-sensitive sensor manufacturing equipment (10), comprising: a cylindrical die (11); a mandrel (12) arranged inside the die (11); and an annular outlet (14) sandwiched between the die (11) and the mandrel (12), wherein the equipment (10) is configured that a tubular body (2) comprising an elastic insulation and having a hollow portion (2a) along a longitudinal direction can be extrusion-molded by discharging an elastic insulating material from the outlet (14), and the mandrel (12) comprises a plurality of helical grooves (121) formed on an outer circumferential surface thereof and an elastic conductive material flow path (122) for supplying an elastic conductive material into not less than two of the grooves (121) from the inside of the mandrel (12).

[3] The pressure-sensitive sensor manufacturing equipment (10) defined by [2], wherein at least one of the plurality of grooves (121) is not in communication with the elastic conductive material flow path (122).

[4] The pressure-sensitive sensor manufacturing equipment (10) defined by [2] or [3], wherein helical outer grooves (111) are formed on an inner circumferential surface of the die (11).

[5] A pressure-sensitive sensor (1), comprising: a tubular body (2) comprising an elastic insulation and having a hollow portion (2a) along a longitudinal direction; and a plurality of helical ribs (3) that are helically provided along an inner circumferential surface (2b) of the hollow portion (2a) of the tubular body (2) and protrude inward from the inner circumferential surface (2b), wherein the helical ribs (3) comprise not less than two conductive ribs (31) comprising an elastic conductor and one or more insulating ribs (32) comprising an elastic insulation.

[6] The pressure-sensitive sensor (1) defined by [5], wherein the conductive ribs (31) are positioned to face each other in a direction perpendicular to a longitudinal direction of the tubular body (2), and one or more insulating ribs (32) are provided between the conductive ribs (31) in a circumferential direction of the tubular body (2).

[7] The pressure-sensitive sensor (1a) defined by [5] or [6], wherein metal wires (4) are provided to run inside the conductive ribs (31).

Although the embodiment of the invention has been described, the invention according to claims is not to be limited to the embodiment. Further, please note that all combinations of the features described in the embodiment are not necessary to solve the problem of the invention.

In addition, the invention can be appropriately modified and implemented without departing from the gist thereof. For example, when the supply amount of the elastic conductive material in the pressure-sensitive sensor manufacturing equipment 10 is increased, a portion of the elastic conductor sometimes enters inside the tubular body 2 even though it is not mentioned in the embodiment. As in such case, a portion of the elastic conductor may enter inside the tubular body 2. Meanwhile, when the supply amount of the elastic conductive material is small, only a top portion of the helical rib 3 (conductive rib 31) is formed of the elastic conductor and a base portion (a portion close to the tubular body 2) of the helical rib 3 (conductive rib 31) is formed of the elastic insulation. As in such case, a portion (base portion) of the conductive rib 31 may be formed of the elastic insulation.

What is claimed is:

1. A method for manufacturing a pressure-sensitive sensor, comprising:
    providing an extruder that comprises a cylindrical die, a mandrel arranged inside the die and having a plurality of helical grooves on an outer circumferential surface, and an annular outlet sandwiched between the die and the mandrel; and
    by using the extruder, performing simultaneous extrusion-molding of an elastic insulating material and an elastic conductive material by supplying the elastic conductive material into not less than two of the grooves from the inside of the mandrel while extruding the elastic insulating material, so as to form a pressure-sensitive sensor,
    wherein the pressure-sensitive sensor comprises a tubular body comprising an elastic insulation and having a hollow portion along a longitudinal direction, and not less than two conductive ribs comprising an elastic conductor and helically provided along an inner circumferential surface of the hollow portion of the tubular body so as to protrude inward from the inner circumferential surface.

2. The method according to claim 1, wherein the conductive rib is formed by extruding the elastic insulating material while being rotated.

3. The method according to claim 1, wherein a plurality of helical outer grooves are formed on an inner circumferential surface of the die, and
    wherein a helical direction of the plurality of helical outer grooves of the die is same as a helical direction of the plurality of helical grooves of the mandrel.

4. The method according to claim 1, wherein a metal wire is provided to run inside the conductive rib by feeding the metal wire together with the elastic conductive material in the plurality of helical grooves of the mandrel.

* * * * *